US011313355B2

(12) United States Patent
Nielsen et al.

(10) Patent No.: US 11,313,355 B2
(45) Date of Patent: Apr. 26, 2022

(54) METHOD AND APPARATUS FOR MONITORING A WIND TURBINE

(71) Applicant: VESTAS WIND SYSTEMS A/S, Aarhus N (DK)

(72) Inventors: Johnny Nielsen, Svenstrup J (DK); Lars Glavind, Randers NV (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/959,125

(22) PCT Filed: Dec. 11, 2018

(86) PCT No.: PCT/DK2018/050347
§ 371 (c)(1),
(2) Date: Jun. 29, 2020

(87) PCT Pub. No.: WO2019/129328
PCT Pub. Date: Jul. 4, 2019

(65) Prior Publication Data
US 2020/0332775 A1  Oct. 22, 2020

(30) Foreign Application Priority Data
Dec. 29, 2017 (DK) .......................... PA 2017 71032

(51) Int. Cl.
*F03D 17/00* (2016.01)

(52) U.S. Cl.
CPC ........ *F03D 17/00* (2016.05); *F05B 2240/912* (2013.01); *F05B 2270/334* (2013.01)

(58) Field of Classification Search
CPC .................................................... F03D 17/00
See application file for complete search history.

(56) References Cited

U.S. PATENT DOCUMENTS

| 6,785,637 | B1 | 8/2004 | Wobben |
| 7,895,018 | B2 * | 2/2011 | Nies .................... G05B 23/0229 |
| | | | 702/188 |

(Continued)

FOREIGN PATENT DOCUMENTS

| EP | 2026160 A1 | 2/2009 |
| EP | 2535579 A1 | 12/2012 |

(Continued)

OTHER PUBLICATIONS

Frank Parker Stockbridge, How Far Off is that German Gun?, Dec. 1918, Popular Science, p. 39 (Year: 1918).*

(Continued)

*Primary Examiner* — Richard A Edgar
*Assistant Examiner* — John S Hunter, Jr.
(74) *Attorney, Agent, or Firm* — Patterson + Sheridan, LLP (57) ABSTRACT

A method for monitoring a wind turbine comprises monitoring an acoustic signal and/or a vibrational signal within a tower of the wind turbine, analyzing the signal to identify one or more predetermined characteristic indicative of an event within the tower, recognizing the event has occurred based on the predetermined characteristic and generating an output based on the recognized event. The one or more predetermined characteristic being at least one of: an amplitude of the signal, a duration of the signal, a shape of the signal, one or more frequencies present in the signal and an energy of the signal.

11 Claims, 7 Drawing Sheets

(56) References Cited

U.S. PATENT DOCUMENTS

| | | | |
|---|---|---|---|
| 9,206,786 B2 * | 12/2015 | Andersen | F03D 7/0296 |
| 2005/0276696 A1 | 12/2005 | LeMieux | |
| 2014/0278151 A1 | 9/2014 | Newman | |

FOREIGN PATENT DOCUMENTS

| | | |
|---|---|---|
| EP | 3051127 A1 | 8/2016 |
| JP | 2013087633 A | 5/2013 |
| WO | 2019129328 A1 | 7/2019 |

OTHER PUBLICATIONS

Danish Patent and Trademark Office, Search Report—Patent for Application: PA 2017 71032, dated: May 3, 2018.
Danish Patent and Trademark Office, Search Opinion for Application: PA 2017 71032, dated Mar. 5, 2018.
Danish Patent and Trademark Office, 1st Technical Examination of Patent Application PA 2017 71032, dated May 3, 2018.
PCT Written Opinion of the International Searching Authority, Application: PCT/DK2018/0503047, dated May 3, 2018.
PCT, International Search Report for Application: PCT/DK2018/050347, dated May 3, 2018.

* cited by examiner

METHOD AND APPARATUS FOR MONITORING A WIND TURBINE

TECHNICAL FIELD

The present invention relates to methods and apparatus for monitoring a wind turbine, particularly the monitoring of events such as falling components hitting a floor within a tower of the wind turbine.

BACKGROUND

There are a number of components within the tower of a wind turbine that may become loose, for example through manufacturing or installation error or anomalous conditions and subsequently fall within the tower. Such components may include monitoring equipment such as sensor parts, structural equipment such as bolts or screws, power generation equipment et cetera, Displacement of these components may lead to a reduction in operational efficiency or may present safety hazards in or around the wind turbine tower. As such, it is desirable to effectively monitor such events so that reparative action may be taken to replace and/or repair the components and restore the original functionality of the wind turbine.

SUMMARY

In accordance with the present invention, there is provided a method for monitoring a wind turbine. The method comprises monitoring an acoustic signal and/or a vibrational signal within a tower of the wind turbine, analysing the signal to identify one or more predetermined characteristic indicative of an event within the tower, recognising the event has occurred based on the predetermined characteristic and generating an output based on the recognised event. The one or more predetermined characteristic being at least one of: an amplitude of the signal, a duration of the signal, a shape of the signal, one or more frequencies present in the signal and an energy of the signal. The method may be a computer-implemented method, for example.

In embodiments, the one or more predetermined characteristic is indicative of a component hitting a floor in the tower.

Analysing the signal may comprise determining the amplitude of the signal and wherein the one or more predetermined characteristic comprises the signal having an amplitude above a predetermined threshold for a minimum duration of time.

Additionally or alternatively, analysing the signal may comprise determining the shape of the signal, wherein the one or more predetermined characteristic comprises the shape of the signal including a first peak amplitude and a second peak amplitude wherein the first and second peaks are spaced apart by a predetermined time. For example, the predetermined time may correspond to a time taken for the signal to travel to one end of the tower and back.

Additionally or alternatively, analysing the signal may comprise applying an algorithm to the signal to determine one or more frequency components of the signal and wherein the one or more predetermined characteristic includes the presence of one or more predetermined frequencies and/or the one or more frequencies having a predetermined amplitude. For example, the algorithm may be a fast Fourier transform of the signal.

In embodiments, the method may comprise monitoring an acoustic signal and analysing the signal may comprise determining the acoustic energy in the acoustic signal and wherein the one or more predetermined characteristic includes a threshold value of acoustic energy.

The output may comprise a signal for generating an alert and/or one or more control command for the wind turbine. The alert may be an audio or visual signal for an operator, the control command may be configured to shut down the wind turbine until the event has been investigated.

In embodiments, the method comprises monitoring a vibrational signal from a floor or wall of the wind turbine tower to identify a predetermined characteristic of the vibration, the predetermined characteristic being indicative of the event.

The method may comprise monitoring the acoustic signal and/or vibrational signal at a plurality of positions within the tower of the wind turbine and may further comprise comparing the signals received at each of the plurality of positions to determine a location of the event within the tower.

Also in accordance with the present invention, there is provided an apparatus for monitoring a wind turbine. The apparatus comprises monitoring equipment for detecting an acoustic signal and/or a vibrational signal within a tower of the wind turbine and a processor coupled to the monitoring equipment and configured to receive and analyse the signal to determine one or more predetermined characteristics indicative of an event, the processor being further configured to recognise an event has occurred based on the predetermined characteristic and generate an output based on the recognised event. The predetermined characteristic being at least one of an amplitude of the signal, a duration of the signal, a shape of the signal, one or more frequencies present in the signal and an energy of the signal The processor may be configured to determine the amplitude of the signal and wherein the one or more predetermined characteristic comprises the signal having an amplitude above a predetermined threshold for a minimum duration of time.

Additionally or alternatively, the processor may be configured to determine the shape of the signal, wherein the one or more predetermined characteristic comprises the shape of the signal including a first peak amplitude and a second peak amplitude wherein the first and second peaks are spaced apart by a predetermined time. For example, the predetermined time may correspond to a time taken for the signal to travel to one end of the tower and back.

Additionally or alternatively, the processor may be configured to apply an algorithm to the signal to determine one or more frequency components of the signal and wherein the one or more predetermined characteristic includes the presence of one or more predetermined frequencies and/or the one or more frequencies having a predetermined amplitude. For example, the algorithm may be a fast Fourier transform of the signal.

In embodiments, the method monitoring equipment may comprise an acoustic sensor and analysing the acoustic signal may comprise determining the acoustic energy in the acoustic signal and wherein the one or more predetermined characteristic includes a threshold value of acoustic energy.

In embodiments, the one or more predetermined characteristic is indicative of a component hitting a floor in the tower.

The apparatus may further comprise means for generating an alert upon, wherein the means for generating an alert is connected to the processor and configured to generate an alert upon receipt of the output to indicate that an event has occurred.

The monitoring equipment may comprises a plurality of sensors for mounting in separate positions in the tower. The processor may be configured to determine a location of the event by comparing received signals from each of the positions.

In embodiments, the monitoring equipment comprises one or more microphones and/or one or more accelerometers.

A wind turbine may comprise the apparatus according to any of the above described embodiments.

BRIEF DESCRIPTION OF THE DRAWINGS

The invention will now be described by way of example with reference to the accompanying drawings, in which.

DETAILED DESCRIPTION

Figure 1:
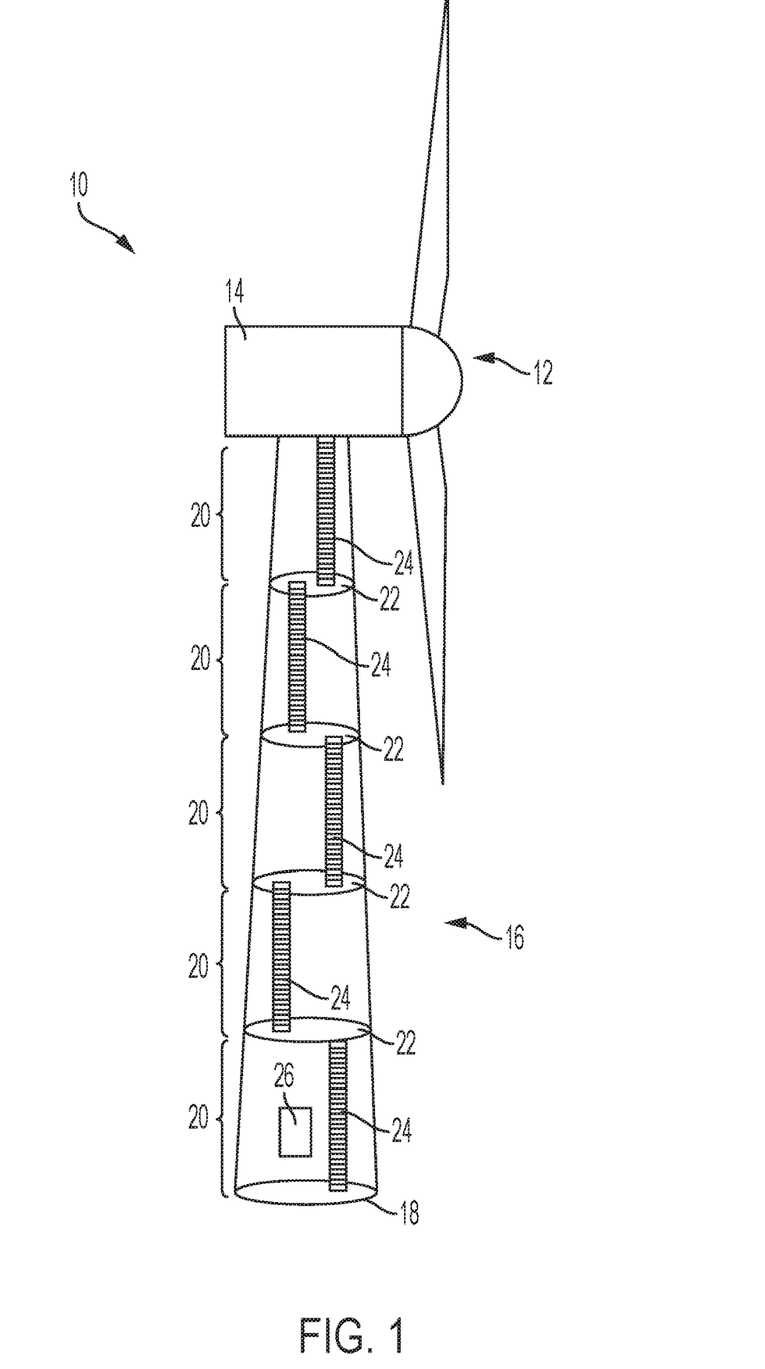
FIG. 1 shows sectional view of a wind turbine.

FIG. 1 shows a sectional view of an example of a wind turbine 10. The wind turbine 10 comprises a rotor 12 which rotates under the influence of the wind, a nacelle 14 containing electrical power generating equipment and a tower 16. The tower 16 extends from a base of the turbine 18 to the nacelle 14 and is formed from a plurality of hollow steel tower sections 20 joined together by bolts and/or welded joints (not shown). Each tower section 20 comprises a horizontal platform 22 and a ladder 24 leading up to the platform 22 of the adjacent tower section 20 to provide access to the nacelle 14 from the base 18.

The wind turbine 10 further comprises a turbine controller 26. The turbine controller 26 typically monitors operating factors of the wind turbine such as wind velocity, electrical power output, rotor speed, pitch angle, generator frequency and current intensity. The turbine controller 26 receives sensor information relating to the operating factors to allow improved control of the wind turbine 10 to maximise power output. The turbine controller may additionally be connected to a cluster controller (not shown) for the monitoring and control of a plurality of such wind turbines.

There are a number of components within the nacelle 14 and tower 16 which may become loose and fall within the tower 16 during operation of the wind turbine 10. Such components may include cable trays and ladders mounted on the tower wall via magnets, individual fasteners such as bolts or screws, auxiliary sensors and the like. Such components may become loose due to manufacturing errors, installation errors, anomalous operating conditions or external factors.

When a component becomes loose and falls within a wind turbine tower 16 it typically hits the platform 22 of the tower section 20 below it. The platform 22 is typically a metal floor and may be positioned 1-2 meters below where the component has fallen from. When the component hits the floor 22, the impact of the component on the floor 22 will generate considerable sound energy and vibration inside the tower that will last for several seconds. The sound can be heard clearly from any position within the tower 16. The present invention relates to methods and apparatus for detection various characteristics of the sound and/or vibration in the tower 16 in order to determine whether such an event has occurred.

Figure 2:
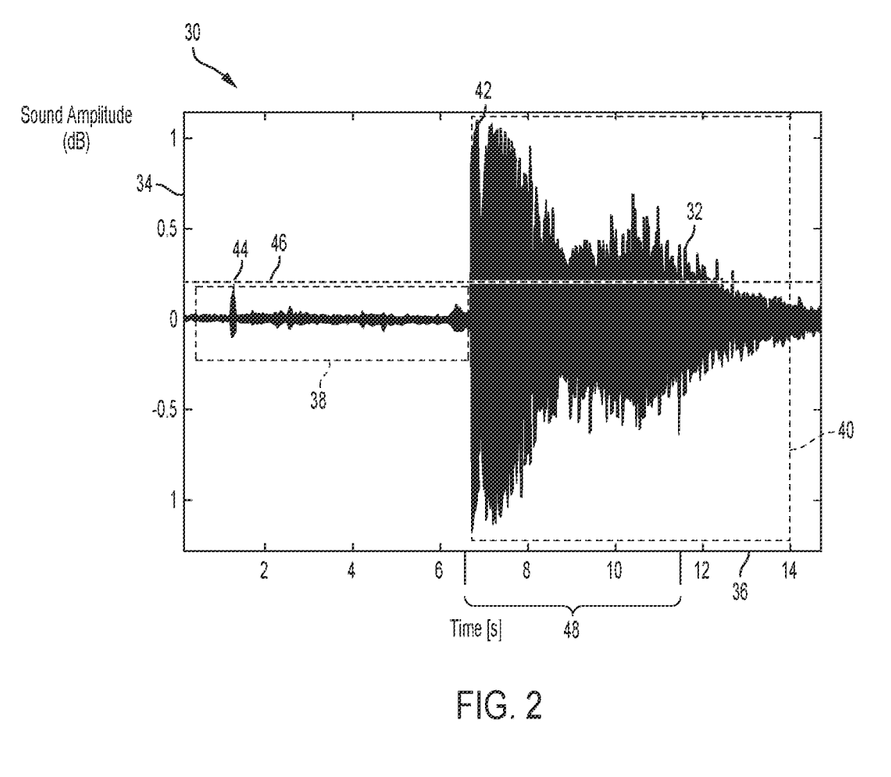
FIG. 2 shows a sound recording of a component hitting a floor within a wind turbine tower.

FIG. 2 shows a graph 30 representing an example acoustic signal 32 recorded within a wind turbine tower 10 as described in relation to FIG. 1 above. The graph 30 measures an amplitude of the signal 34 against time 36. The acoustic signal 32 comprises a first part 38 recorded during normal operation of the wind turbine 10 and a second part 40 recorded during an event in which a component fell and hit a floor within the tower 16. The first part 38 of the signal shows a small amount of variation in sound amplitude accounting for the sound of the wind turbine itself 10 in operation and background noise generated by external factors. The second part 40 shows a distinctive pattern representing the sound of the component hitting a floor 22 within the tower.

It is possible to determine a number of characteristics of the second part of the signal 40 that are distinct from the first part 38 and therefore indicative of the component falling within the tower 16. Measurable characteristics of the acoustic signal 32 may include one or more detected amplitudes of the signal, a duration of the signal, shape of the signal, frequencies present in the signal and energy of the signal which may be detected by one or more methods as will be described in greater detail below.

For example, the second part of the signal 40 has much greater maximum peak amplitude 42 than the first part 38. Moreover, the second part 40 maintains a peak amplitude above the maximum peak amplitude 44 of the first part 38 for a particular duration of time, hereinafter referred to as the event duration.

More generally, the second part 40 has a peak amplitude above a threshold value 46 for the event duration 48. The threshold value 46 could be the maximum amplitude under normal operating conditions 44 as described above or could be less than or greater than the maximum amplitude under normal operating conditions 44. The threshold value 46 could be any predetermined value considered indicative of an event when present for a predetermined period of time. The threshold value 46 and event duration 48 can be determined via testing or could be derived from known properties of the component, for example.

As can be seen from FIG. 2, a threshold value 46, where the peak amplitude of the signal is significantly higher than the background noise, could be selected as 0.2 and the event duration 48, during which the peak amplitude is above the threshold value 46, could be selected to be greater than 5 seconds. In the illustrated graph of FIG. 2, the measure of amplitude is a normalised signal where 1 is the maximum measurable value of the acoustic recording device such that all values above 1 will be saturated. The gain on the input signal from the acoustic sensor has been adjusted to give a peak value of around 1 during an event with a small object. So 0.2 is 20% of maximum measurable sound input. It will be appreciated that, due to light filtering on the data shown, FIG. 2 does also show values nominally greater than 1.

As such, when the peak amplitude is 0.2 or greater for 5 seconds or more, it is determined that a component has fallen within the tower 16 and follow up action may be required. In some embodiments, the event duration 48 could be a range of time i.e. between 4 and 6 seconds in order to exclude events lasting much longer than 5 seconds which may indicate an alternative event but also allow slight variation in the event, for example the component falling from a different height or hitting the floor at a different angle. Additionally or alternatively the peak amplitude could be within a range for example, between 0.2 and 0.8.

It will be appreciated that FIG. 2 shows an acoustic signal for a particular component hitting the steel floor 22 of a wind turbine 10 and that other events, such as other components falling and/or hitting other parts of the wind turbine 10 could also be monitored and alternate threshold values and event durations determined therefrom without departing from the scope of the invention. The particular values mentioned above are intended for illustration only.

Figure 3:
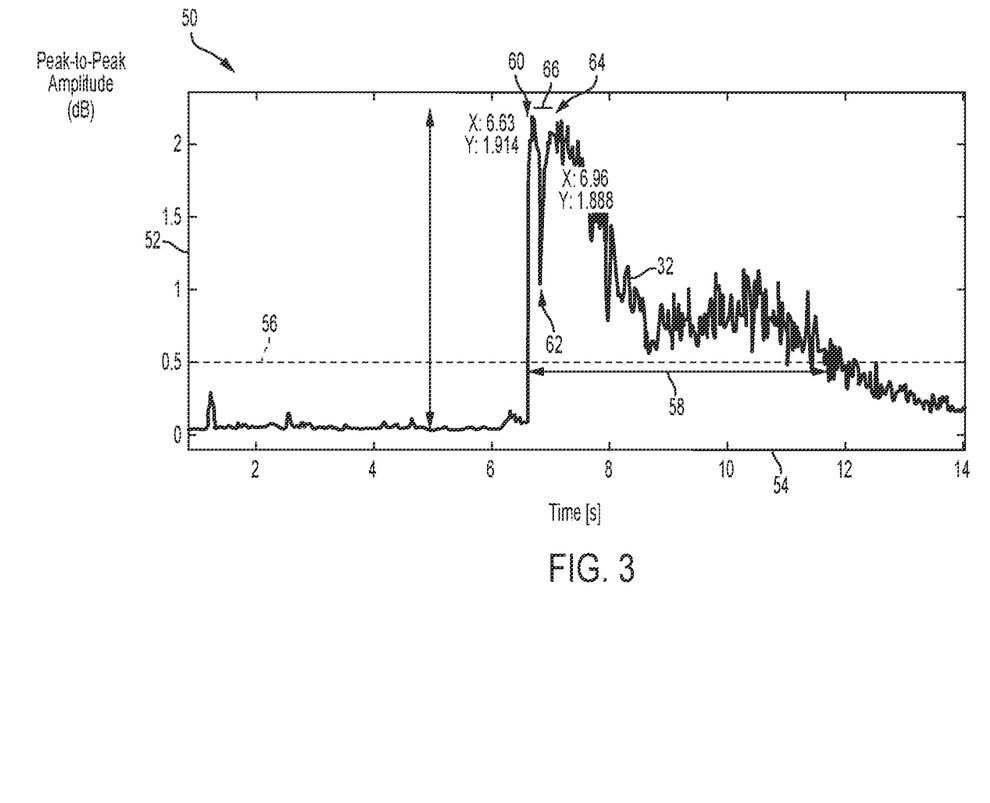
FIG. 3 shows the sound recording of FIG. 2 processed to determine peak to peak values within a moving window.

In embodiments, the acoustic signal detected within the tower could be processed into an alternative form in order to facilitate the detection of the one or more characteristics. For example, the signal may be processed to determine the peak-to-peak amplitude of the recorded signal over time. Such processing may result in a clearer picture of the characteristics of the signal, as shown in FIG. 3. FIG. 3 is a graph 50 peak-to-peak amplitude values 52 over time 54, within a moving window of the acoustic signal 32 of FIG. 2. That is, FIG. 3 looks at the difference between the maximum and the minimum values during a certain period of time, for example 10 milliseconds, and stores that value. The next 10 millisecond period is then measured and stored, followed by the next 10 milliseconds et cetera over the entire sampling period to produce the graph of FIG. 3. So, in this example, a 10 second signal will be divided into 1000 peak-to-peak values irrespective of the sampling frequency.

By using the peak-to-peak amplitude 52 of the acoustic signal it may be easier to identify one or more characteristics of the signal for detecting the event when compared to the original acoustic signal 32 as shown in FIG. 2. For example, the plot of FIG. 3 could be monitored to detect whether the peak-to-peak amplitude 52 stays above a predetermined threshold limit 56 for a minimum period of time 58 analogous to the event duration. This might be easier to detect when compared to the oscillating value of the original acoustic signal 32 as shown in FIG. 2. In these embodiments, the threshold value of amplitude 56 and the event duration 58 are predetermined characteristics of the signal considered to be indicative of that particular component falling from its desired position and hitting a metal floor 22 of the tower section 20 below it.

In embodiments, alternative or additional characteristics of the acoustic signal could be used to determine if an event has occurred. For example, the shape of the acoustic signal could also be considered indicative of the event.

Referring back to FIG. 3, the acoustic signal comprises a first peak in amplitude 60 after which there is a drop in amplitude 62 followed by a second peak in amplitude 64 of a similar amplitude to the first peak 60. In this example there is gap 66 of about 330 milliseconds between the beginning of each of the first and second peaks 60, 64. This gap 66 corresponds to the time taken for the sound to travel to the top of the tower 16 and back again (around 2×60 m). In this example, the amplitude 56 and gap 66 could be considered characteristics of the signal indicative of the event. A more detailed analysis of the signal shape can also be used where the knowledge of how the sound signal travels back and forth in the tower 16 can be taken into account.

Another way to detect an event is to analyse the frequency contents of the signal, for example by using a fast Fourier transform of the signal. A fast Fourier transform (FFT) may sample a signal over a period of time and divide it into its frequency components.

Figure 4A:
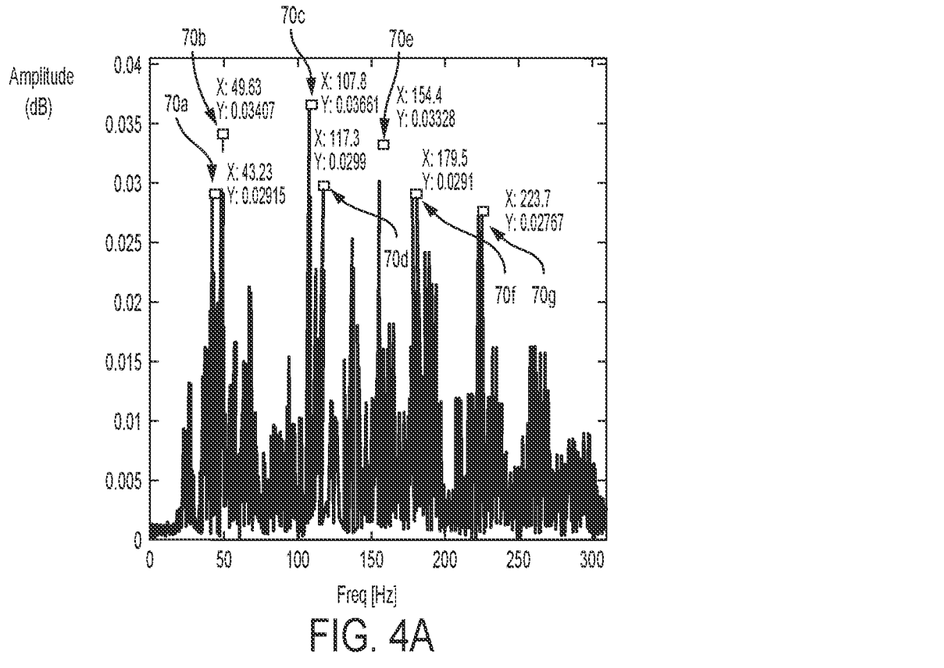
FIG. 4a shows a fast Fourier transform of the sound recording of FIG. 2.
Figure 4B:
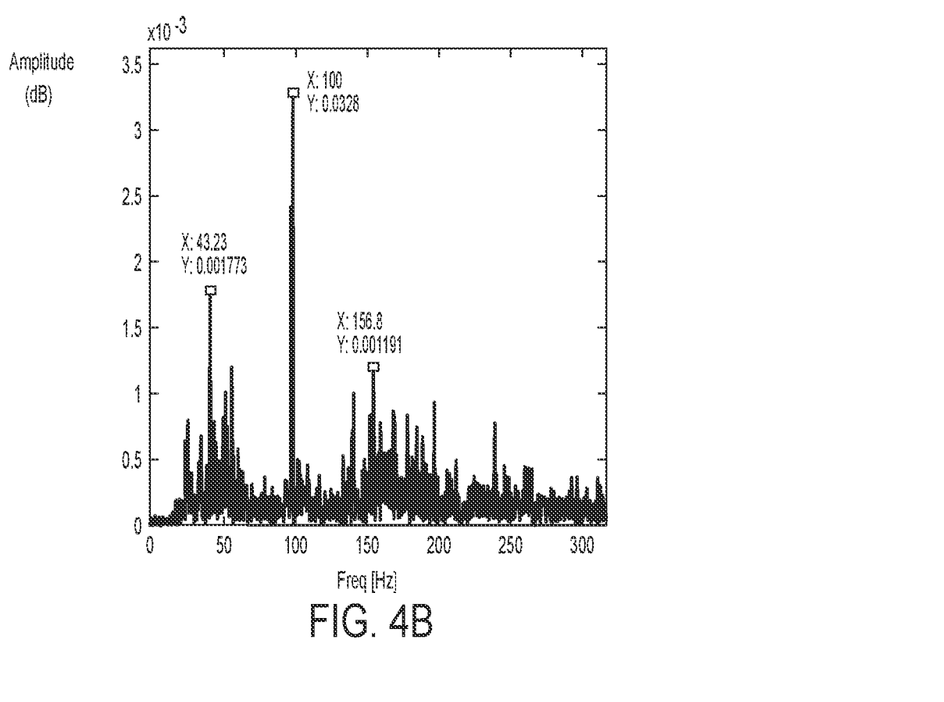
FIG. 4b shows a fast Fourier transform of a sound recording of normal operational conditions within a wind turbine.

FIG. 4a shows a FFT of the second part of the acoustic signal of FIG. 2 detecting a falling object. Over the duration of the event the signal contains a plurality of distinct dominant frequencies 70a, 70b, 70c, 70d, 70e, 70f, and 70g. For comparison, FIG. 4b shows a FFT of the first part of the acoustic signal of FIG. 2 recording normal operation of the wind turbine 10. When comparing the frequency contents of the sound during an event with the frequency contents during normal operation, it is clear that many frequencies are only present during the event. Some of the frequencies are both present during both normal operation and during the event, but the amplitude of them is heavily increased during the events. For example a dominant frequency of 43.23 Hz is present in both FIGS. 4a and 4b but the amplitude is much greater in FIG. 4a (0.02915 cf. 0.001773).

As such, by recording different constructed scenarios with different events it can be possible to find a common frequency footprint for the events and search for that in the recorded sound. For example, there may be one or more particular frequencies present only during the event which could be a predetermined characteristic of the signal indicative of the event. Additionally or alternatively, the amplitude of one or more frequencies could be identified as a characteristic of the signal during the event.

In embodiments, a measure of vibration in the tower could be used to determine if an event has occurred. If a component hits the floor, it will make the floor vibrate. The vibration of the floor will also make the wall of the tower vibrate. Thus by using one or more vibration sensors that are placed on the floor and/or on the wall of the tower it may be possible to detect an event in a similar way as described for the acoustic signal above.

Figure 5:
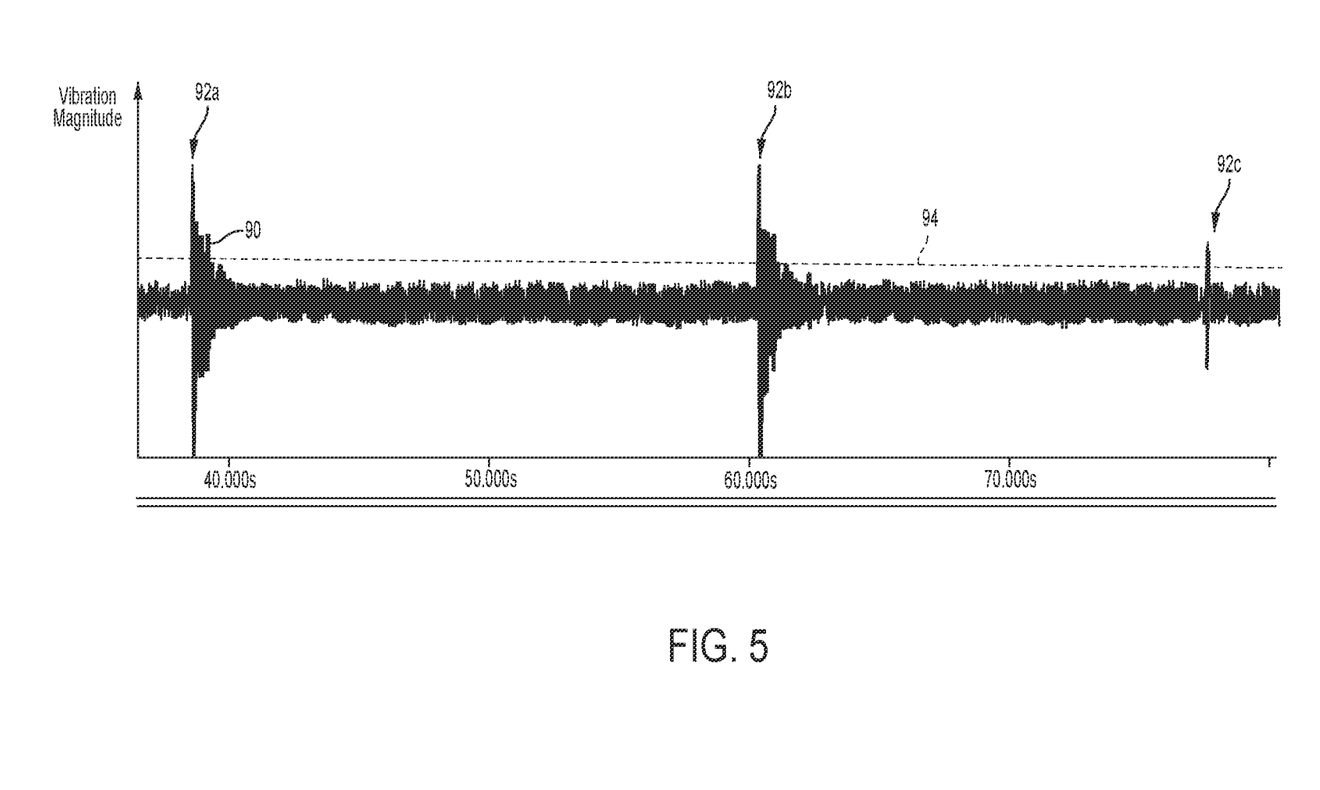
FIG. 5 shows vibration sensed in the walls of the wind turbine tower.

FIG. 5, for example, shows the vibration 90 in a tower over time during three separate events 92a, 92b, and 92c as detected by a tower mounted vibration sensor. During each of the three events 92a, 92b, and 92c the magnitude of the vibration increases beyond a threshold amount, for example as shown by the dashed line 94. As such, the threshold amplitude of vibration 90 could be one possible characteristic of the signal used to determine if an event has occurred.

In embodiments, the acoustic signal and/or vibration could be monitored at more than one position within the tower simultaneously. For example, the acoustic signal could be monitored at two, three, four or more different positions within the tower. In a particular embodiment, the acoustic signal could be monitored at a first position adjacent the base of the tower and also monitored at a second position adjacent the nacelle. By monitoring the signal at different locations in the tower it is possible to determine the location of the event by comparing the different times of arrival and/or amplitudes of the signals sensed at each position. For example, if the signal arrives at the first position before the second position and has a higher amplitude at the first position than the second position, then it can determined that the falling object hit the floor closer to the first position than the second position. The exact difference in time of arrival can be used to determine how much closer to the first position the object fell and thus give a more precise idea of where the component fell.

Determining a more precise position at which the component fell could save time for the maintenance personnel who would otherwise need to inspect each platform to locate the fallen object. This would result in a reduced downtime of the wind turbine therefore an increase in production.

Furthermore, by monitoring both acoustics and vibration in the tower it is possible to detect an event more reliably and reject false events. Taking account of the different speed of sound traveling in air and vibration in steel the location of the event can be determined even more accurately. Moreover, it may be possible to determine if the sounds comes from an event outside the turbine or somewhere inside the turbine that cannot be related to the specific event that is being looked for. For example, if an object hits the tower at a position between two platforms (either from outside or inside), the location can be determined and compared to the known positions of the platforms. If the position is considered not to be spaced from a platform it may be considered not to be an event. In a particular example, an object may hit the tower 10 metres from a platform. An acoustic sensor may be positioned just above the platform and a vibration sensor may be positioned on the tower adjacent the acoustic sensor. As the speed of sound in steel is around 5000 metres/second, it will only take 2 milliseconds before the vibration sensor detects it but almost 30 milliseconds before the acoustic sensor detects it. If an object instead hits the platform then the acoustic sensor will detect it within 10 milliseconds after the vibration sensor. In this way it may be possible to distinguish between objects hitting the platform (herein considered an event) and objects hitting other parts of the tower (not considered an event).

Another characteristic of the acoustic signal that could be used to determine an event is the acoustic energy profile. The acoustic energy profile is the amount of energy contained in the sound created and may be derived from the acoustic signal by known methods. One possible approach for detecting an event is to look at the amount of energy in the sound during a certain period of time. For example, if the average energy during a specified period of time exceeds a predetermined threshold this may be considered a characteristic of the event.

Figure 6:
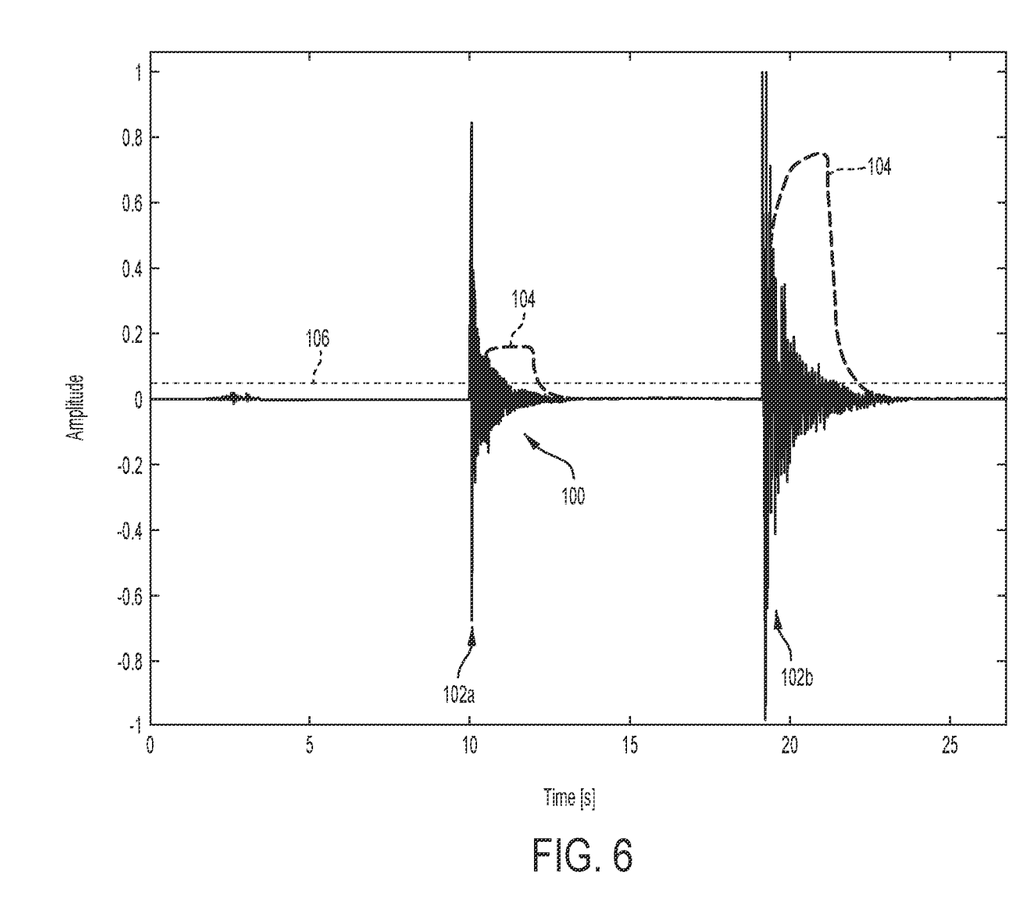
FIG. 6 shows an average of the sound energy from an acoustic signal over two events.

FIG. 6 shows an acoustic signal 100 representing a first event 102a in which a first object falls and hits the steel floor and a second event 102b in which a second object falls and hits the steel floor. In the illustrated example, the second object is larger than the first object and produces a louder sound.

Also shown in FIG. 6 is the two second moving average of the energy in the sound (that is, the average energy over the previous two second at any given point in time) represented by the dotted line 104. The straight line 106 is the predetermined threshold of energy in the signal considered indicative of the event.

In the illustrated example, all frequencies are weighted equally and the response of the microphone used to detect the sound is disregarded. However, in embodiments the signal may be processed to in order to focus only on the energy in one or more specific frequency ranges and/or may disregard the energy in one or more specific frequency ranges. This could be achieved by applying high, low or band pass filters to only look at certain frequencies or by using a band stop filter to suppress certain frequencies. The algorithm for processing the signal may also take the frequency response of the microphone into account to improve the accuracy of the energy contents. For example, either by providing a filter that compensates for the non-linear frequency response of the microphone or by having different gains of the energy coming from different frequencies In embodiments, the length of the moving average window and the threshold value can be adjusted dependent on the type of event or events being monitored.

Figure 7:
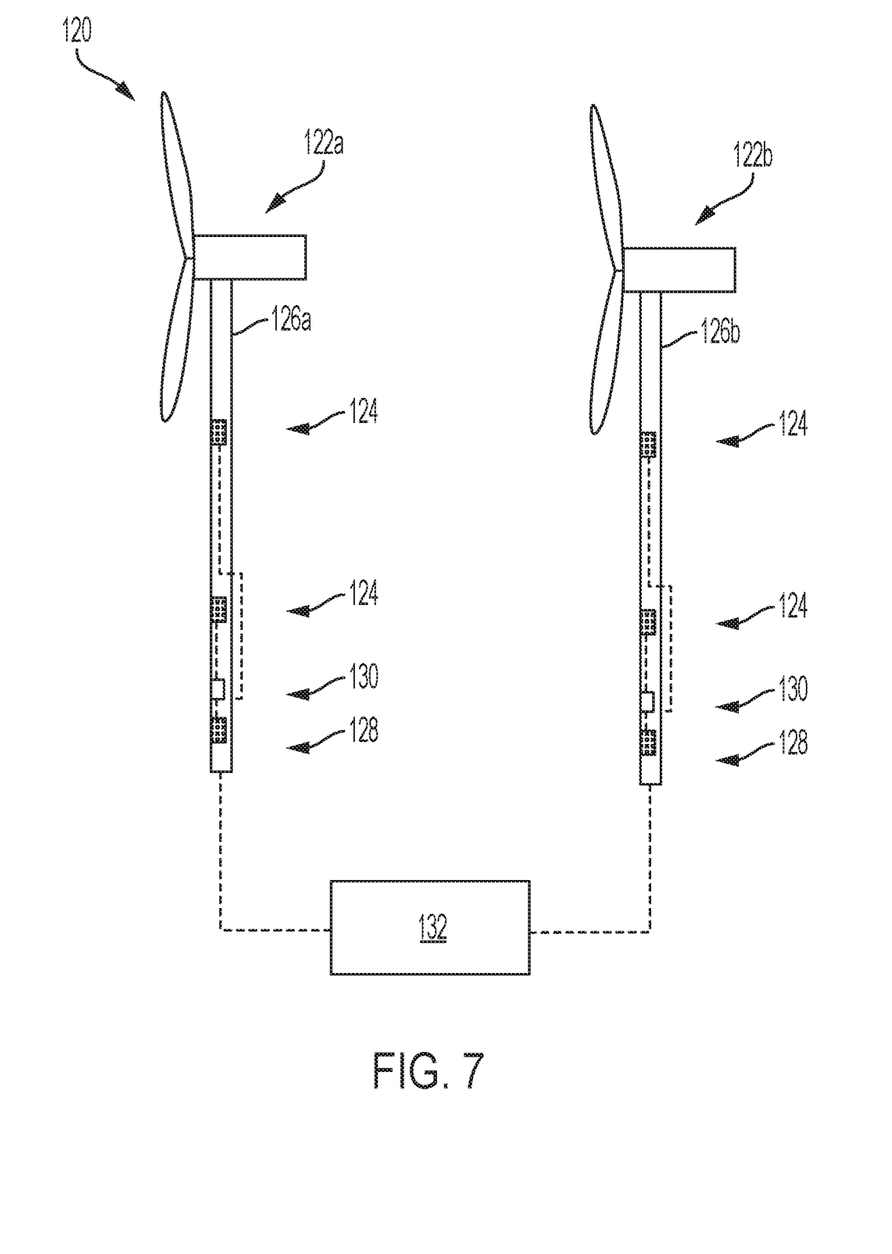
FIG. 7 shows acoustic monitoring apparatus for monitoring an acoustic signal from a plurality of positions within the tower.

FIG. 7 shows example apparatus 120 for detecting an event in one or more wind turbines 122a, 122b. For simplicity, the illustrated example shows two wind turbines 122a, 122b, however it will be appreciated that the described apparatus may be used to monitor one wind turbine or more than two wind turbines. For example, the apparatus may be used to monitor an entire wind farm or portions thereof.

Each wind turbine 122a, 122b comprises one or more units 124 mounted within its respective tower 126a or 126b for detecting acoustic signals within the tower 126a or 126b. Each unit 124 may comprise one or more sensors and one or more processing units. The processing units are provided with memory for storing a program used to process data received from the sensors and to store received data from the sensors for further investigation or for improvement of algorithms. The processor is configured to recognize one or more events based on the received sensor data and stored characteristics. In embodiments, the processor may comprise one or more look-up tables, probability analysis, self-learning algorithms.

For example, the event recognition may be based on simple combinations of the different detection methods, such as a combination of energy and the time duration of an event and the location of the event. So, if the measured energy is between two threshold values and the duration between two threshold values and location is a first or second platform then it is determined that a first event has occurred. If the measured energy between another two threshold values and the duration between another two threshold values and location is a third or fourth platform then it is determined that a second event has occurred and so forth.

Additionally or alternatively event recognition may be based on probability analysis. For example, if the measured energy is at a value then it is calculated that there is a 50% chance that a first event has occurred and a 35% chance that a second event has occurred. If the duration is another value, then it is determined that there is a 20% chance that the first event has occurred and 50% chance that it was the second event and 10% chance that it was a third event. If the measured location is a first location then there may be a 10% chance that it was the first event, 50% chance that it was the second event and 30% that it was the third event. Given the above described probabilities it may be determined that the second event is the most likely event.

Additionally or alternatively, event detection may be based on machine learning algorithms as known in the art.

Each unit 124 may comprise one or more sensors in the form of at least one acoustic sensor and/or vibration sensor. The acoustic sensor may be any receiver for the measurement of sound waves in air. For example the acoustic sensor may comprise one or more microphones as known in the art. Suitable microphones could include condenser/capacitive microphones, fibre optic microphones, piezoelectric microphones, electret microphones and/or acoustic wave sensors.

The vibration sensors may be any receiver for the measurement of structural vibrations. One suitable vibration sensor may be an accelerometer. The accelerometer may be rigidly connected with the wall or floor of the tower 126, The accelerometer may also be configured to measure acceleration in the wall or floor of the tower 126 in at least one axis. The sensitivity, mass, mounting and relevant frequency ranges may be selected in accordance with the event that is to be measured. Additionally or alternatively, other types of vibration sensor may be used, for example use optical sensors such as laser-Doppler vibrometers. The units 124 may also include temperature sensors to compensate for temperature affected measurements and/or to help improving the event detection. For example, the gain of the sensors may change with temperature. Furthermore, if the temperature of the tower 126 changes quickly there could be some significant sound created as the steel is expands. As such, by measuring the temperature in the tower 126, it may be possible to compensate for this by incorporating these factors in the event detection algorithm, for example.

The units 124 may further comprise a housing to assist with mounting the sensors and/or processing units to the tower. In embodiments, the processing units may be contained within the housing and the sensors may be mounted either externally or internally of the housing or both externally and internally. The unit 124 may be mounted internally to the tower wall by magnets, for example. Although other mounting means such as fasteners or welding may be used additionally or alternatively.

The illustrated apparatus comprises two units 124 per tower each placed at different heights within the tower. However, it will be appreciated that more than two units 124 may be placed at a plurality of locations within the tower. As discussed above, the ability to monitor sound and/or vibration from a plurality of positions may improve the detection of the event, Each unit 124 may be placed just above one of the platforms in the tower to facilitate installation and service.

Each unit 124 may be connected to a turbine controller 128, for example via an Ethernet switch 130. Each turbine controller 128 may also be connected to a cluster controller 132. The cluster controller 132 may control operation of an entire wind park or a plurality of wind parks. Alternatively, the cluster controller 132 may control operation of a subset of wind turbines within a wind park. The cluster controller 132 is used, inter alias, to monitor operational factors of each wind turbine to ensure safe and reliable automatic operation. The cluster controller 132 also handles communication interfaces, collects and stores operation data for further analysis. In embodiments, each unit 124 may be directly connected to the cluster controller 132 without any communication with a turbine controller 124. To minimize the wiring, power to the units 124 can come from a switch with Power over Ethernet (POE) functionality. If the units 124 are connected to a turbine controller 128 it will be possible to trigger alarms or warnings in the same way as other events that are directly detected by the turbine controller 128.

The event detection can be implemented directly in each unit 124 or the units 124 can provide the sensor data to the turbine controller 128 that can then perform the event detection. Alternatively, the cluster controller 132 may perform the event detection for all turbines in a park or subset thereof. The event detection can also be any combination of the stated scenarios.

In the event that the one or more predetermined characteristics are detected, the turbine and/or cluster controller may be configured to produce an alert to indicate that an event has occurred. The alert may comprise an audio or visual signal to for detection by an operator, for example. The alert may comprise information relating to the event that has been detected. For example the alert may contain information relating to the nature of event that has occurred and one or more appropriate actions to take in response to the event.

In some embodiments, the detection of an event may trigger an automatic control signal to adjust operation of the wind turbine. For example, the detection may trigger a control signal to stop operation of the wind turbine until the event has been rectified. It can also just be a log indicating that further analysis of the stored data of a potential event is required to determine if turbines need to shut down or a service visit is required.

The above described methods may be used to monitor more than one type of event. For example, more than one type of component falling within the tower. In such embodiments, characteristics relating to each event may be stored for analysis and detection.

It will be appreciated that the present invention could be used to monitor events in wind turbines having different structure to that shown in FIG. 1. For example, the method could be used to monitor for such an event in wind turbines without steel platforms. In which case, a falling object may create a different sound or vibration which could be characterised in a similar way as described in relation to the embodiments above.

It will also be appreciated that the present invention may be used to detect any suspicious sounds inside the tower. For example, an insufficiently lubricated yaw system, frequency changes of fans or other devices may all produce sounds having distinct characteristics that can be monitored in a similar manner. More generally, the frequency contents of the sound of the wind turbine in normal operation can also be recorded and if it suddenly deviates from that an event can be triggered.

While embodiments of the invention have been shown and described, it will be understood that such embodiments are described by way of example only and it will be appreciated that features of different embodiments may be combined with one another. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method for monitoring a wind turbine, the method comprising:
   detecting, using a first microphone positioned by a first platform within a tower of the wind turbine and a second microphone positioned by a second platform within the tower, a first sound and a second sound;
   in response to determining, by a processor communicatively coupled to the first microphone and the second microphone, that the second sound originated from a location between the first platform and the second platform and not from the first platform or the second platform and in response to determining, by the processor, that the first sound originated from the first platform or the second platform, analyzing, using the processor, a first signal generated based on the first sound but not a second signal generated based on the second sound to identify one or more predetermined characteristics indicative of an object hitting the first platform within the tower, the one or more predetermined characteristics being at least one of:
   an amplitude of the first signal, or
   one or more frequencies present in the first signal;
   recognizing that the object hit the first platform based on the one or more predetermined characteristics; and
   stopping operation of the wind turbine based on the recognizing that the object hit the first platform.

2. The method of claim 1, wherein the step of analyzing, using the processor, the first signal comprises determining the amplitude of the first signal and wherein the one or more predetermined characteristics comprise the first signal having an amplitude above a predetermined threshold for a minimum duration of time.

3. The method of claim 1, wherein the step of analyzing, using the processor, the first signal comprises determining a shape of the first signal and wherein the one or more predetermined characteristics comprise the shape of the first signal including a first peak amplitude and a second peak amplitude wherein the first peak amplitude and the second peak amplitude are spaced apart by a predetermined time.

4. The method of claim 3, wherein the predetermined time corresponds to a time taken for the first signal to travel to one end of the tower and back.

5. The method of claim 1, wherein the step of analyzing, using the processor, the first signal comprises applying an algorithm to the first signal to determine one or more frequency components of the first signal and wherein the one or more predetermined characteristics include one or more predetermined frequencies or one or more frequencies having a predetermined amplitude.

6. The method of claim 1, further comprising determining an acoustic energy in the first signal and wherein the one or more predetermined characteristics include a threshold value of acoustic energy.

7. The method of claim 1, further comprising generating an alert or one or more control commands for the wind turbine.

8. The method of claim 1, further comprising monitoring a vibrational signal from a floor or wall of the tower to identify a predetermined characteristic of the vibrational signal, the identified predetermined characteristic being indicative of the object hitting the first platform.

9. An apparatus for monitoring a wind turbine, the apparatus comprising:
a first microphone and a second microphone arranged to detect a first sound and a second sound, the first microphone positioned by a first platform within a tower of the wind turbine and the second microphone positioned by a second platform within the tower; and
a processor coupled to the first microphone and the second microphone and configured to:
in response to determining that the second sound originated from a location between the first platform and the second platform and not from the first platform or the second platform and in response to determining that the first sound originated from the first platform or the second platform, analyze a first signal generated based on the first sound but not a second signal generated based on the second sound to determine one or more predetermined characteristics indicative of an object hitting the first platform, the one or more predetermined characteristics being at least one of:
an amplitude of the first signal, or
one or more frequencies present in the first signal;
recognize that the object hit the first platform based on the one or more predetermined characteristics; and
stop operation of the wind turbine based on the recognizing that the object hit the first platform.

10. The apparatus of claim 9, the processor further configured to generate an alert to indicate that the object hit the first platform.

11. A wind turbine, comprising:
a tower;
a nacelle disposed on the tower;
a first microphone and a second microphone arranged to detect a first sound and a second sound, the first microphone positioned by a first platform within the tower and the second microphone positioned by a second platform within the tower; and
a processor coupled to the first microphone and the second microphone and configured to perform an operation comprising:
in response to determining that the second sound originated from a location between the first platform and the second platform and not from the first platform or the second platform and in response to determining that the first sound originated from the first platform or the second platform, analyzing a first signal generated based on the first sound but not a second signal generated based on the second sound to determine one or more predetermined characteristics indicative of an object hitting the first platform, the one or more predetermined characteristics being at least one of:
an amplitude of the first signal, or
one or more frequencies present in the first signal;
recognizing that the object hit the first platform based on the one or more predetermined characteristics; and
stopping operation of the wind turbine based on the recognizing that the object hit the first platform.

* * * * *